US012151131B1

(12) United States Patent
Siegel et al.

(10) Patent No.: US 12,151,131 B1
(45) Date of Patent: Nov. 26, 2024

(54) FIRE PANEL END OF LINE SUPERVISION MONITORING

(71) Applicant: Tyco Fire & Security GmbH, Schaffhausen (CH)

(72) Inventors: Adam Elijah Siegel, Milwaukee, WI (US); Daniel Paul Cianfrocco, Clinton, MA (US)

(73) Assignee: TYCO FIRE & SECURITY GMBH, Schaffhausen (CH)

( * ) Notice: Subject to any disclaimer, the term of this patent is extended or adjusted under 35 U.S.C. 154(b) by 50 days.

(21) Appl. No.: 18/319,275

(22) Filed: May 17, 2023

(51) Int. Cl.
*G08B 29/04* (2006.01)
*A62C 37/50* (2006.01)
*G08B 7/06* (2006.01)
*G08B 29/06* (2006.01)

(52) U.S. Cl.
CPC ................ *A62C 37/50* (2013.01); *G08B 7/06* (2013.01); *G08B 29/043* (2013.01); *G08B 29/06* (2013.01)

(58) Field of Classification Search
None
See application file for complete search history.

(56) References Cited

U.S. PATENT DOCUMENTS 1,176,806 A 3/1916 Gouin et al.
3,952,294 A * 4/1976 Emerson .............. G08B 29/043 340/629
5,157,708 A * 10/1992 Garthwaite ........... H04M 3/308 324/556
5,170,429 A * 12/1992 Stocklin ................ H04M 3/308 379/457
5,193,108 A * 3/1993 Stocklin .................. H04M 3/26 324/555
5,293,155 A * 3/1994 Nicol ...................... G08B 29/06 340/517
6,104,286 A * 8/2000 Luquette .............. G08B 29/181 340/517
6,259,363 B1 * 7/2001 Payne .................. G08B 29/043 340/508
8,446,285 B2 5/2013 Lontka
10,762,770 B1 * 9/2020 Barson ................... G08B 29/06

(Continued)

FOREIGN PATENT DOCUMENTS

CN 107290630 A 10/2017

OTHER PUBLICATIONS

Search Report & Written Opinion issued Jun. 14, 2024 for International Patent Application No. PCT/US2024/020544.

*Primary Examiner* — Muhammad Adnan
(74) *Attorney, Agent, or Firm* — ArentFox Schiff LLP

(57) ABSTRACT

A fault sensing circuit is provided in a remote device configured to be connected to an end of line resistor (EOLR) that is used to detect wiring faults. The fault sensing circuit includes a current monitoring subcircuit configured to detect when an input current of the remote device has crossed a fault threshold corresponding to a fault in the remote device. The fault sensing circuit further includes a switching subcircuit connected to the current monitoring subcircuit and the EOLR. The switching subcircuit is configured to electrically connect a fault resistor in parallel with the EOLR to change a value of an end of line resistance for a fault indication when the input current of the remote devices has crossed the fault threshold.

20 Claims, 4 Drawing Sheets

(56) References Cited

U.S. PATENT DOCUMENTS

| | | | | |
|---|---|---|---|---|
| 2004/0051643 A1* | 3/2004 | Bullmore | G08B 25/018 | 340/506 |
| 2007/0085694 A1* | 4/2007 | Larkin | G08B 29/06 | 340/650 |
| 2020/0372785 A1* | 11/2020 | Barson | G08B 29/06 | |

* cited by examiner

FIRE PANEL END OF LINE SUPERVISION MONITORING

FIELD

The present disclosure relates generally to fire-alarm control systems. More particularly, the present disclosure relates to fire panel end of line supervision monitoring in fire-alarm control systems.

BACKGROUND

An End-of-Line Resistor (or EOLR) is a resistor of a known value that completes the zone circuit in a fire alarm system. The purpose of an EOLR is to allow the control panel to supervise the field wiring for open or short circuit conditions. In general, a control panel detects 3 fault conditions: short circuit; normal; and open circuit. The purpose of an EOLR is to allow the control panel to differentiate between the three conditions by looking for a known resistance using an internal detection circuit.

Thus, the purpose of supervision in a fire alarm system is to pass a small supervision current so the security panel can evaluate its field wiring. If the resistance is not within the acceptable range, then the change in state can be reported immediately, and the trouble will be detected. By installing the resistor at the farthest device on the zone (the “end of line”), a supervised circuit is created that cannot be disabled by simply shorting it’s wire somewhere along the wire run between the control panel and detection device. The EOL resistor is located at the end device so the circuit can be monitored for shorts in this manner.

In ensuring the wires are not broken and always connected, the fire alarm control panel is always checking the continuity of the wires by sending a small current through the wires to “supervise” the wires. If the current stops or is too large, then the panel turns on its trouble light and/or buzzer. This is how a person supervising the operation of the system, such as an owner of the building, can see there is a problem. Since the trouble light and/or buzzer come on before a fire occurs, the problem with the wiring can be fixed so that when a fire breaks out the fire alarm system will be capable of notifying people.

The fire alarm panel may be connected to strobes or horns, for example. Since the end of line resistor is external to each of these remote devices, if one of these devices (assuming this device does not have the fault detection circuit proposed herein) were to fail in such a way that it is either open circuit, or does not draw enough current to induce a short circuit condition, it may go undetected.

Therefore, there is still a need in the art to improve the functionality and efficiency of end of the line resistor use in a fire alarm system.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to one or more aspects, a fault sensing circuit is provided in a remote device configured to be connected to an end of line resistor (EOLR) that is used to detect wiring faults. The fault sensing circuit includes a current monitoring subcircuit configured to detect when an input current of the remote device has crossed a fault threshold corresponding to a fault in the remote device. The fault sensing circuit further includes a switching subcircuit connected to the current monitoring subcircuit and the EOLR. The switching subcircuit is configured to electrically connect a fault resistor in parallel with the EOLR to change a value of an end of line resistance for a fault indication when the input current of the remote devices has crossed the fault threshold.

According to other aspects, a fire detection system is provided that uses an end of line resistor (EOLR) to detecting wiring faults. The fire detection system includes a fire alarm control panel. The fire direction system includes a plurality of remote devices operating in parallel. Each of the plurality of remote devices includes a fault sensing circuit. The fault sensing circuit includes a current monitoring subcircuit configured to detect when an input current of a remote device in which the fault sensing circuit is installed has crossed a fault threshold corresponding to a fault in the remote device. The fault sensing circuit further includes a switching subcircuit connected to the current monitoring subcircuit and the EOLR. The switching subcircuit is configured to electrically connect a fault resistor in parallel with the EOLR to change a value of an end of line resistance for a fault indication when the input current of the remote devices has crossed the fault threshold.

According to still further aspects, a method is provided for fault sensing by a fault sensing circuit in a remote device. The remote device is configured to be connected to an end of line resistor (EOLR) that is used to detect wiring faults. The method includes detecting, by a current monitoring subcircuit, when an input current of the remote device has crossed a fault threshold corresponding to a fault in the remote device. The method further includes electrically connecting, by a switching subcircuit connected to the current monitoring subcircuit and the EOLR, a fault resistor in parallel with the EOLR to change a value of an end of line resistance for a fault indication when the input current of the remote device has crossed the fault threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Figure 1:
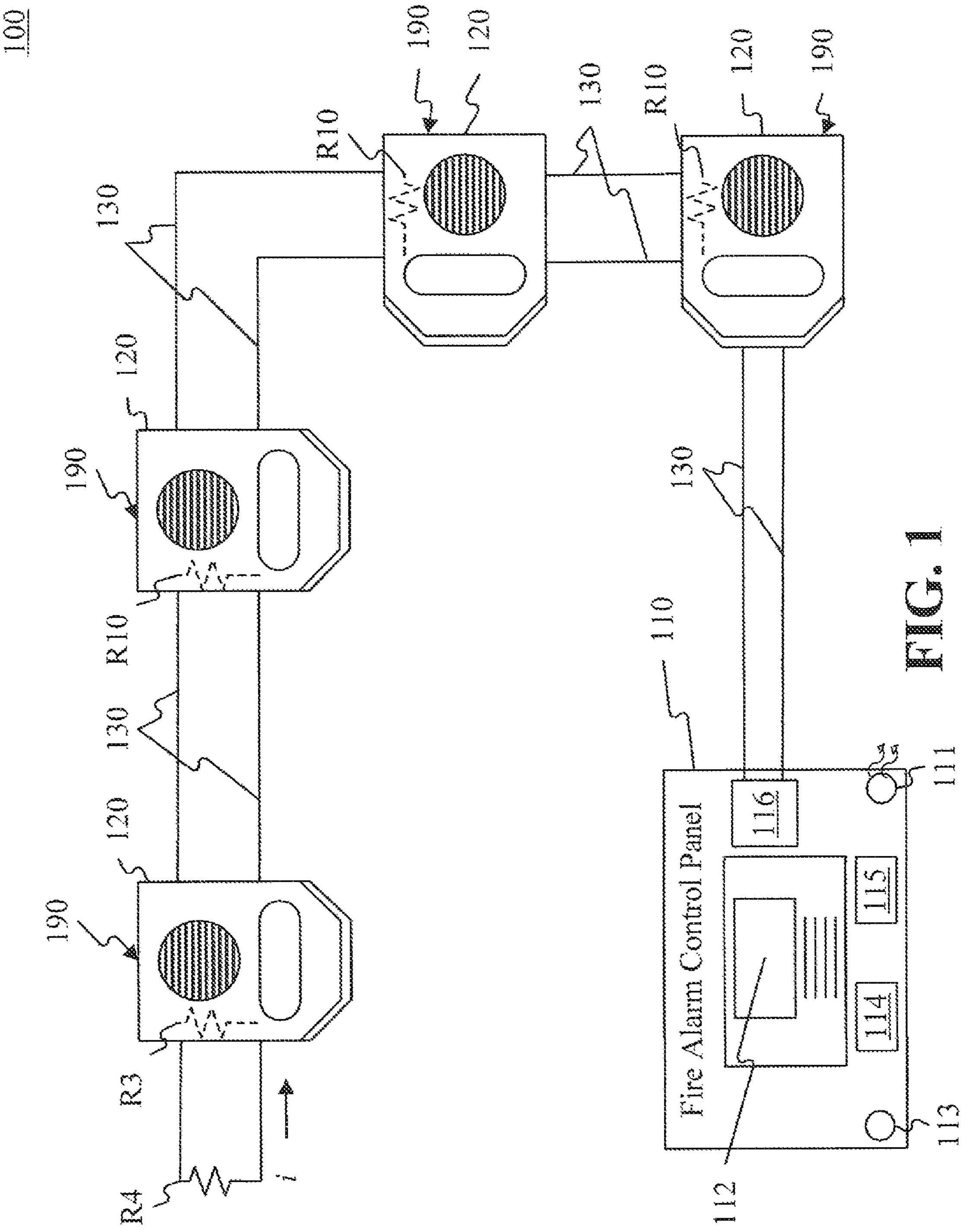
FIG. 1 is a block diagram of an example of a fire notification system, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

There exist addressable and non-addressable devices in fire alarm systems. Addressable devices are typically processor-based, while non-addressable devices are typically non-processor-based. For addressable devices, if something goes wrong such as a short circuit in a device, then there is a trouble indication that is provided which is device specific, thus enabling the readily identification of the failing device from among multiple devices in service. However for non-addressable devices like the devices to which aspects of the present disclosure are directed, there are certain failure modes that remain unknown until a technician goes out into the field and does a test on every single device to make sure that they all still work. For example, a higher current than an expected operating current may occur due to one or more component failures in a device, where the higher current and thus device failure or, at the least, device mis-operation, would typically go undetected. The procedure of going into the field testing every single device can be extremely inefficient and time-consuming, especially in fire alarm systems with a large number of devices.

Thus, aspects of the present disclosure add a fault sensing circuit to non-processor-based remotely located devices (hereinafter "remote devices") with respect to a fire alarm control panel to detect if there is a certain problem such as, e.g., internal shorts and component failures on a device that does not have any sort of processor or controller. The fault sensing circuit provides multiple ways to indicate a problem. The fault sensing circuit can indicate a problem by generating a signal. In an aspect, the signal is generated locally by a switch on the failing device. In an aspect, the signal is generated locally by the failing device and is detected by the fire alarm control panel. The fault sensing circuit can indicate a problem by lighting up a light emitting diode (LED) in the device which includes the fault sensing circuit. The fault sensing circuit can also indicate a problem by causing the performing of one or more "actions" at a fire alarm control panel. Such "actions" can include. e.g., but are not limited to, providing an audio and/or visual (LED) alarm, causing a message to be output on the fire alarm control panel, causing a notification message to be transmitted from the fire alarm control panel to another device, and so forth. Hence, the features of the present disclosure avoid the inefficiencies of current solutions that have a technician go into the field and test a set of devices in order to determine that there is a fault and then further have to identify a location of the faulty device.

A feature of the fault sensing circuit in accordance with various aspects of the present disclosure is that it evaluates the wiring of a fire alarm system to which the fault sensing circuit is connected, and when the fault sensing circuit detects that the wiring has become damaged, the fault sensing circuit intentionally applies a fault to the circuit in order to indicate a decision. That decision is not made with a processing unit such as a microcontroller. Instead, the decision. e.g., the fault indication, is made with a fault sensing circuit as described herein.

Referring now to FIG. 1, a fire notification system 100, also referred to as a fire alarm system, is shown, according to an exemplary aspect. Fire notification system 100 is a system for providing notification in the case of a fire. In accordance with various aspects of the disclosure, fire notification system 100 includes remote devices 120 that each include a fault sensing circuit 190 for detecting an overcurrent condition in the installed device which can be indicative of a broken wire, a failed component, and so forth. In an aspect, the fault sensing circuit 190 causes a resistor R3 to be electrically connected in a parallel with the EOLR R4 in order to change the resistance detected at the fire alarm control panel 110 in order to indicate a remote failure at the fire alarm control panel 110. Resistor R3 is shown using dashed lines in FIG. 1 to denote it is selectively connected to the supervision circuit including EOLR R4 when there is a failure in one of the remote devices 120. The supervision circuit is formed by the wires 130, the EOLR R4, and a small voltage source 116 (e.g., 9 or 12 or 24 VDC).

Fire notification system 100 can be any system that includes a fire alarm control panel 110 and a plurality of remote devices 120, which in some implementations may be non-processor based devices, interconnected by fire notification system wiring 130. In the aspect of FIG. 1, remote devices 120 are non-addressable devices.

The remote devices 120 can be any devices capable of detecting a fire or other emergency condition and relaying audible, visible, or other stimuli to alert building occupants of the fire or other emergency condition. For example, a remote device 120 can include, but is not limited to, any of the following: a smoke detector, a heat detector, a speaker, a microphone, a buzzer, a fire alarm switch (e.g., a pull switch), a light (e.g., LED), and so forth.

Remote devices 120 may be powered by a DG power source (e.g., a battery). Remote devices 120 can include a light notification module and a sound notification module. The light notification module can be implemented as a light emitting device or any component in remote devices 120 that alerts occupants of an emergency by emitting a visible light signal. In some aspects, remote devices 120 emit strobe flashes to alert building occupants of an emergency situation. A sound notification module can be a speaker or any component in the remote devices 120 that alerts occupants of an emergency by emitting an audible signal. In some aspects, which should not be construed as limiting, remote devices 120 may emit one or more audible signals.

Accordingly, the fire alarm control panel 110 performs a supervision function by continually checking the continuity of the fire notification system 100 wires to make sure they are connected and not broken by sending a small current i through the wires 130 of the fire notification system 100 using a supervision voltage source 116. The small current i can be, e.g., in the range of 1 mA-4.5 mA. Thus, the fire alarm control panel 110, among other functions, performs a supervision process on the wires of the fire notification system 100 using the small current and an end of line resistor (EOLR) R4 whose value is checked by an ohmmeter 115 of the fire alarm control panel 110.

In an aspect, a change in the value of the end of line resistance by the fault resistor R3 causes a remote overcurrent indication reading at the fire alarm control panel 110 regarding a non-descript one of a plurality of remote devices 120 having a fault. Again, the fire alarm control panel 110 will not be able to distinguish which remote device 120 has the fault, but enables a technician who has access to the plurality of devices 120 in the system 100 to identify the specific device 120 associated with the fault due to the local LED D1 of the faulty device 120 emitting light.

There are three possible conditions for the fire alarm control panel 110 to measure: full open-circuit voltage (if the circuit is open), reduced voltage (if the circuit is closed and secure), and no voltage if the wiring has been compromised.

In the aspect of FIG. 1, the EOLR R4 is included at the end of the line of a plurality of connected remote devices 120. Each of the plurality of remote devices 120 is evaluated by a respective fault sensing circuit 190 that performs self-fault detection in accordance with aspects of the present disclosure. Specifically, each fault sensing circuit 190 is configured with a fault resistor R3 that is capable of being electrically connected in parallel with the EOLR 0R4 to change a known resistance expected to be seen by the ohmmeter 115 of the fire alarm control panel 110 with another but different known resistance formed by the parallel combination of the EOLR R4 and the fault resistor R3. The different resistances can be used to indicate different things, where the first known resistance is that solely of the EOLR R4 and is indicative of the wiring 130 being operational (no shorts or opens) and where the second known resistance is the value of the parallel combination of the EOLR R4 and fault resistor R3 indicating a fault with one of the remote devices 120. In some example implementations, which should not be construed as limiting, fault sensing circuit 190 enables a visual inspection of the remote device 120 for a lit LED D1 indicating a fault in that device. Further, in some cases, the output of the fault sensing circuit 190 may additionally be received by the fire alarm control panel 110 and cause an action to be performed at the fire alarm control panel 110 to give a technician an indication that there is a faulty remote device. In this case, the action caused at the fire alarm control panel 110 may include, but is not limited to, one or more of; lighting a lighting device 111 on the tire alarm control panel 110, displaying a message on a display 112 of the fire alarm control panel 110, generating an audible sound at a sound generating device 113 (such as a speaker) of the fire alarm control panel 110 or elsewhere in the system 100, and/or transmitting a message from a wired or wireless transmitter device 114 of the fire alarm control panel 110 to another device. In other words, the fault sensing circuit 190 causes actions that are configured so that the technician can then identify the faulty remote device 120 within the building or facility in which the system 100 is installed. For instance, in an aspect, the fire alarm control panel 110 includes the lighting device 111, such as an LED, that lights in response to the change in the value of the end of line resistance caused by the fault sensing circuit 190 based on a wiring fault detected by the EOLR R4. In an alternative or additional example, the fire alarm control panel 110 includes a sound generating device 113 (e.g., a buzzer, a speaker, etc.) that generates an audible sound in response to the change in the value of the end of line resistance by the fault resistor R3.

Figure 2:
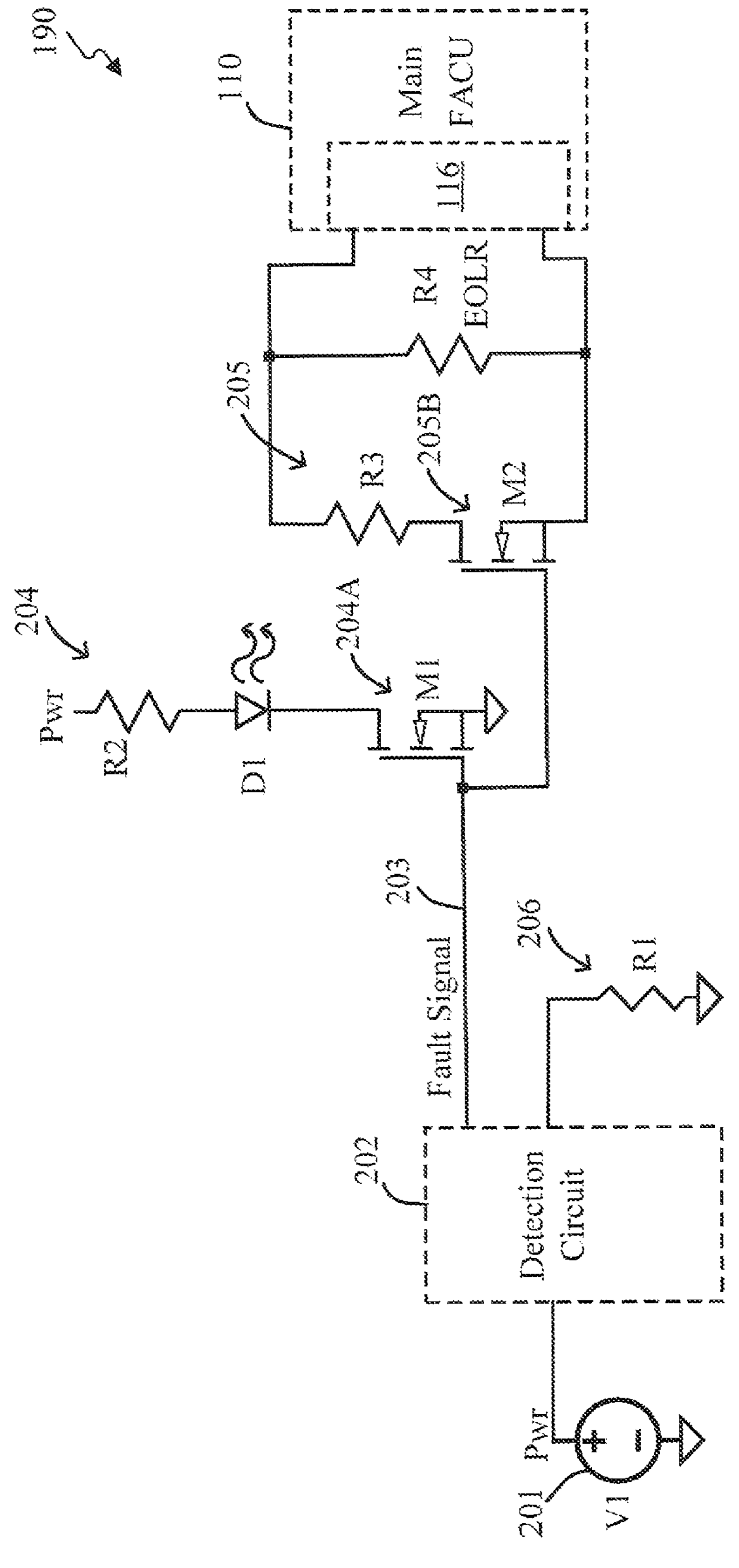
FIG. 2 is a schematic diagram of an example of a current-based fault sensing circuit, according to an aspect.

Referring now to FIG. 2, a fault sensing circuit 190 in a remote device 120 is shown, according to an exemplary aspect.

The fault sensing circuit 190 is configured to detect an overcurrent condition in a device (e.g., remote device 120) that includes the fault sensing circuit 190. The fault sensing circuit 190 includes a first switch subcircuit 204, a second switch subcircuit 205, fault resistor R3, a load subcircuit 206, and a power supply V1 201. The fault sensing circuit 190 may include or may interact with (as shown in the embodiment of FIG. 2) a fault detection subcircuit 202. For example, an output of an existing (not part of fault sensing circuit 190) component or a node value may be used as the fault signal 203.

The fault sensing circuit 190 is operatively coupled to the fire alarm control panel 110 through the EOLR R4. The fault sensing circuit 190 is configured to electrically connect the fault resistor R3 to the EOLR R4 when a fault is detected by fault detection subcircuit 202 due to a change in load subcircuit 206. In this way, the resistance detected by the ohmmeter 115 of the fire alarm control panel 110 changes a predictable amount indicative of a remote fault in a non-specific one of the remote devices 120. In an aspect, fault sensing circuit 190 may include any circuit capable of detecting an overcurrent indication (as fault detection subcircuit 202) including a comparator circuit for comparing a reference threshold voltage (e.g., voltage V1 201) to the output from the load subcircuit 206 and outputting the fault signal 203 in response to the comparison results. However, it is to be appreciated that other detector arrangements can also be used, as the present disclosure is not dependent on the particular circuitry used in the fault detection subcircuit 202 and simply requires a signal indicative of a fault (i.e., fault signal 203).

The load subcircuit 206 is a generic representation of fault sensing circuit 190 excluding the fault detection subcircuit 202. During normal operation, the fault sensing circuit 190 excluding the fault detection subcircuit 202 behaves like a large resistor. During a fault condition, this will trend a lot lower, i.e. toward 0. In an embodiment, load subcircuit includes one or more resistive components. In the example of FIG. 2, the resistive components are represented by resistor R1 (also referred to as R{load} for illustration. Other resistive representations may also be used to represent.

The fault detection subcircuit 202 receives voltage V1 201 and is responsive to a present state of the load subcircuit 206 as described above, for example in comparison to voltage V1 201. In further detail, depending on the state of the load subcircuit 206, a fault signal capable of being at a high voltage (fault detected) or a low voltage (no fault detected) will be output from the fault detection subcircuit 202. This output voltage signal will trigger the operation of the first switch subcircuit 204 and second switch subcircuit 205.

The triggering of the first switch subcircuit 204 will light up LED D1 which receives current through pullup resistor R1 of the first switch subcircuit 204 in the example of FIG. 2.

The triggering of the second switch subcircuit 205 will control M2 to electrically connect fault resistor R3 in parallel with EOLR R4 to change the end of line resistance. This change in the end of line resistance can then be detected by the ohmmeter 115 of the fire alarm control panel 110.

The switching subcircuits 204 and 205 each include a switch 204A and 205A, respectively. In an aspect, any suitable switch that may be used including, for example, transistors, relays, and so forth.

In an aspect, the switch 204A is a transistor. In an aspect, the transistor 204A is a Metal Oxide Semiconductor Field Effect Transistor (MOSFET) M1.

In an aspect, MOSFET M1 has a gate terminal connected to an output of the fault detection subcircuit 202 for receiving the fault signal 203, a non-gate terminal connected to diode D1, and another non-gate terminal connected to ground. In an aspect, the MOSFET M1 is an N-channel enhancement type MOSFET having a source connected to one end of the diode D1 and a drain connected to ground.

In an aspect, the MOSFET M2 has a non-gate terminal connected to one end of the EOLR R4 and another non-gate terminal connected to one end of the fault resistor R3, wherein another end of the EOLR R4 is operatively coupled to another end of the fault resistor R3. In an aspect, the MOSFET M2 is an N-channel enhancement type MOSFET having a source connected to one end of the EOLR R4 and a drain connected to one end of the fault resistor R3, wherein another end of the EOLR R4 is operatively coupled to another end of the fault resistor R3. In an aspect, a drain current only flows into the fault resistor R3 to increase the value of the end of line resistance for the fault indication when a gate voltage is applied to a gate of the N-channel enhancement type MOSFET M2 that is greater than the threshold current value corresponding to the fault in the remote device 120. Of course, P-channel and depletion type MOSFETS can also be used while maintaining the spirit of the present disclosure. As noted above, the increase in the value of the end of line resistance changes a known resistance expected to be seen by the ohmmeter 115 of the fire alarm control panel 110 with another but different known resistance. The first known resistance is that solely of the EOLR R4 and is indicative of the wiring 130 being operational (no shorts or opens) and the second known resistance is the value of the parallel combination of the EOLR R4 and R3 indicating a fault with one of the remote devices 120.

In an aspect, a change in the value of the end of line resistance by electrically connecting the fault resistor R3 to the EOLR R4 causes the lighting of another LED 111 remotely at the fire alarm control panel 110 and/or activation of a sound generating device 113 (buzzer, speaker, etc.) at the fire alarm control panel 110 and/or a message to be displayed on a display 112 of the fire alarm control panel 110 and/or a notification message to be transmitted from the fire alarm control panel 110 to another device. That way the field technician will know that something is wrong and then they can find the device 120 that has the LED D1 lit.

In an aspect, a change in the value of the end of line resistance by electrically connecting the fault resistor R3 to the EOLR R9 causes an action to be performed at the fire alarm control panel 110 indicative of a fault in the remote device 120. The fire alarm control panel 110 will not be able to distinguish which remote device 120 has the fault, but enables a technician who has access to the plurality of devices 120 in the system 100 to identify the specific device 120 associated with the fault due to the local LED D1 of the faulty device 120 emitting light.

Differential amplifier U1 can be, for example, Analog Devices® AD549 Ultralow Input-Bias Current Operational Amplifier. Comparator U2 can be, for example, Analog Devices® LT1015 dual high speed comparator. MOSFET M can be, for example, Infincon® BSB014N04LX3 MOSFET. Of course, other equivalents can also be used while maintaining the spirit of the present disclosure.

Figure 3:
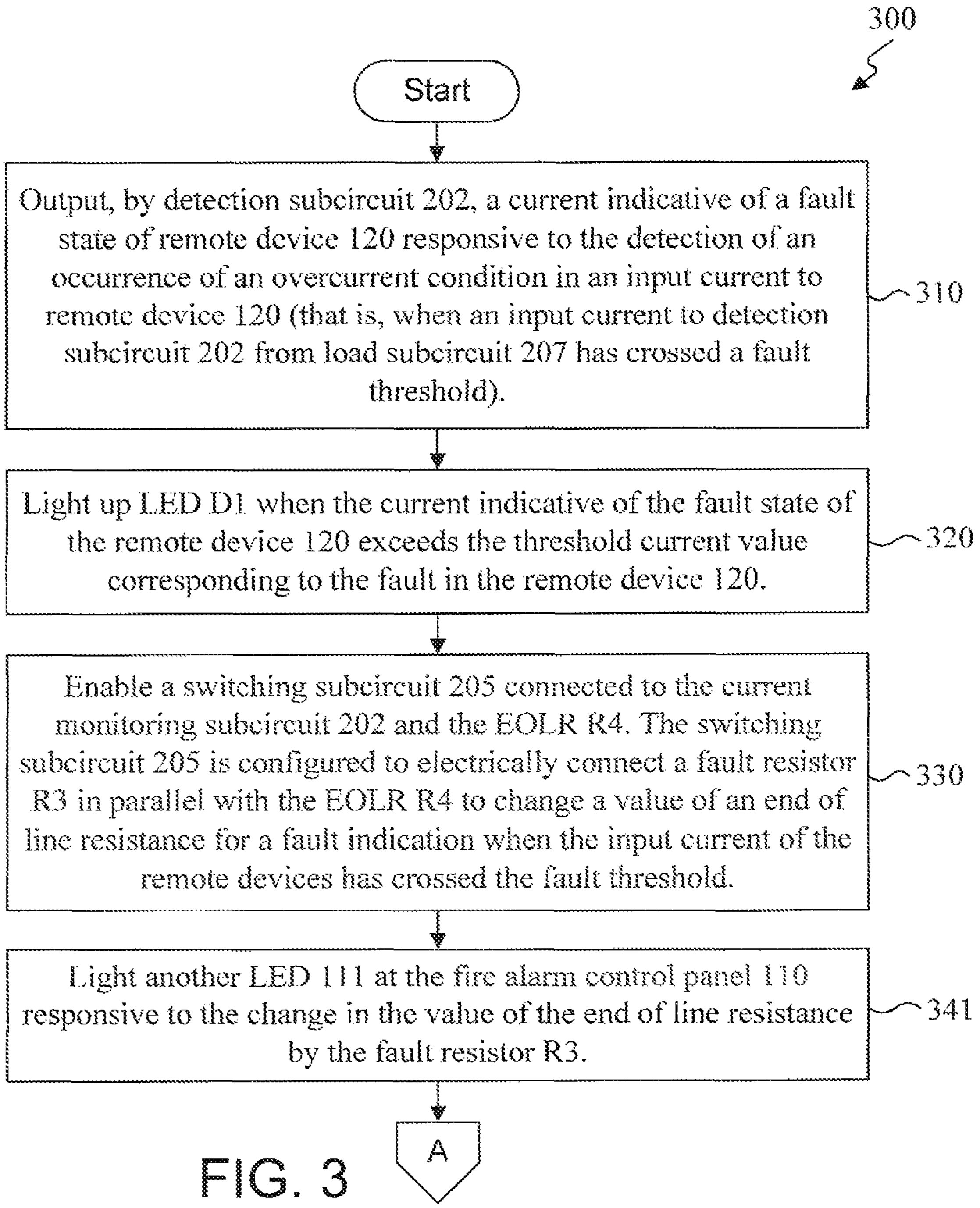
FIGS. 3-4 are flow diagrams of a method for fault sensing by a fault sensing circuit in a remote device, according to an aspect.
Figure 4:
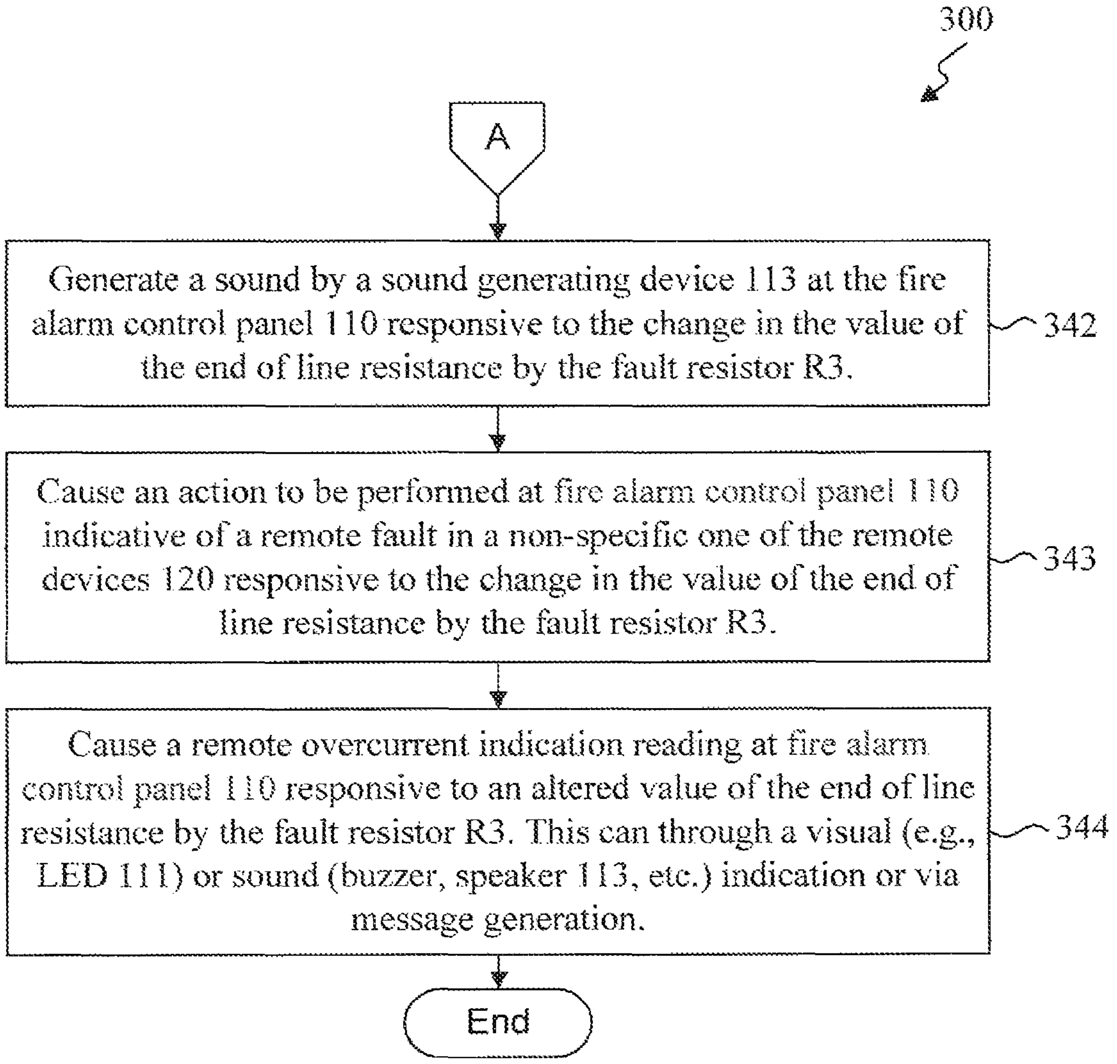

Referring now to FIGS. 3-4, a method 300 for fault sensing in a remote device, such as one of devices 120, is shown, in accordance with an exemplary aspect.

At step 310, the method 300 includes outputting, by detection subcircuit 202, a current indicative of a fault state of remote device 120 responsive to the detection of an occurrence of an overcurrent condition in an input current to remote device 120 (that is, when an input current to detection subcircuit 202 from load subcircuit 206 has crossed a fault threshold).

In an aspect, method 300 can include step 320.

At step 320, the method 300 includes lighting up LED D1 when the current indicative of the fault state of the remote device 120 exceeds the threshold current value corresponding to the fault in the remote device 120.

At step 330, the method 300 includes enabling a switching subcircuit 205 connected to the current monitoring subcircuit 202 and the EOLR R4. The switching subcircuit 205 is configured to electrically connect a fault resistor R3 in parallel with the EOLR R4 to change a value of an end of line resistance for a fault indication when the input current of the remote devices 120 has crossed the fault threshold.

In an aspect, method 300 can include one or more of steps 341 through 344.

At step 341, the method 300 includes lighting another LED 111 at the tire alarm control panel 110 responsive to the change in the value of the end of line resistance by the fault resistor R3.

At step 342, the method 300 includes generating a sound by a sound generating device 113 at the fire alarm control panel 110 responsive to the change in the value of the end of line resistance by the fault resistor R3.

At step 343, the method 300 includes causing an action to be performed at fire alarm control panel 110 indicative of a remote fault in a non-specific one of the remote devices 120 responsive to the change in the value of the end of line resistance by the fault resistor R3.

At step 344, the method 300 includes causing a remote overcurrent indication reading at fire alarm control panel 110 responsive to an altered value of the end of line resistance by the fault resistor R3. Remote overcurrent indication means providing an indication at the fire alarm control panel 110 of an overcurrent situation in a remote device. This can through a visual (e.g., LED 111) or sound (buzzer, speaker 113, etc.) indication or via message generation (on the display 112 or on the speaker 113) at the fire alarm control panel 110 responsive to the altered value of the end of line resistance.

Thus, aspects of the present disclosure use an altered end of line configuration.

The most common failure in electronic circuits is something fails short and draws too much power. Aspects of the present disclosure provide a fault sensing circuit 190 that measures if there is too much current, that is, more than the fault sensing circuit 190 was designed to consider as an acceptable amount. Then, the fault sensing circuit 190 turns on a switch (e.g., FET M1) that will intentionally cause a fault condition (e.g., add a fault resistor R10 in parallel with the EOLR R9 to change the value seen by fire alarm control panel 110 with respect to the end of line resistance).

The fault sensing circuit 190 will overload the end of line by the EOLR R9. Then the fault sensing circuit 190 can indicate there is something wrong using the above described methods. This is more beneficial than breaking the circuit at the end of line because breaking it requires, e.g., interrupting, and that is more work to wire, and poses a risk that a technician will wire it wrong.

Once the power threshold is crossed, there is a fault condition indicated that lights a local LED D1 and provides a remote indication (e.g., another LED 111) at fire alarm control panel 110.

An example of one typical application for this type of circuit is to determine that there is an overcurrent event, but that is typically done with devices that have some type of processor where you have a reporting in such a case. Hence, it is determinable that there is this sort of problem.

For the types of circuit boards that may be used with the features of the present disclosure, however, the amount of current that the circuit boards will pull when they fail short is not enough to really cause a problem outside of the board, since fire alarm control panel just sees a small increase in current that the fire alarm control panel 110 is not otherwise programmed to be concerned with and/or indicate. Thus, aspects of the present disclosure can be advantageously used in such scenarios.

Reference in the specification to "one aspect" or "an aspect" of the present disclosure, as well as other variations thereof, means that a particular feature, structure, characteristic, and so forth described in connection with the aspect is included in at least one aspect of the present disclosure. Thus, the appearances of the phrase "in one aspect" or "in an aspect," as well any other variations, appearing in various places throughout the specification are not necessarily all referring to the same aspect.

It is to be appreciated that the use of any of the following "1", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

It should be understood that the application is not limited to the details or methodology set forth in the following description or illustrated in the figures. It should also be understood that the phraseology and terminology employed herein is for the purpose of description only and should not be regarded as limiting.

While the exemplary aspects illustrated in the figures and described herein are presently preferred, it should be understood that these aspects are offered by way of example only. Accordingly, the present application is not limited to a particular aspect, but extends to various modifications that nevertheless fall within the scope of the appended claims. The order or sequence of any processes or method steps may be varied or re-sequenced according to alternative aspects.

What is claimed is:

1. A fault sensing circuit in a remote device configured to be connected to an end of line resistor (EOLR) that is used to detect wiring faults, the fault sensing circuit comprising:

- a current monitoring subcircuit configured to detect when an input current of the remote device has crossed a fault threshold corresponding to a fault in the remote device; and
- a switching subcircuit connected to the current monitoring subcircuit and the EOLR, the switching subcircuit configured to electrically connect a fault resistor in parallel with the EOLR to change a value of an end of line resistance for a fault indication when the input current of the remote devices has crossed the fault threshold.

2. The fault sensing circuit according to claim 1, further comprising another switching subcircuit connected to the current monitoring subcircuit and configured to light up a light emitting diode (LED) of the remote device when the input current of the remote device has crossed the fault threshold.

3. The fault sensing circuit according to claim 1, wherein the switching subcircuit comprises a Metal Oxide Semiconductor Field Effect Transistor (MOSFET) configured to switch the fault resistor in parallel with the EOLR.

4. The fault sensing circuit according to claim 3, wherein the MOSFET has a non-gate terminal connected to one end of the EOLR and another non-gate terminal connected to one end of the fault resistor, wherein another end of the EOLR is operatively coupled to another end of the fault resistor.

5. The fault sensing circuit according to claim 3, wherein the MOSFET is an N-channel enhancement type MOSFET having a source connected to one end of the EOLR and a drain connected to one end of the fault resistor, wherein another end of the EOLR is operatively coupled to another end of the fault resistor.

6. The fault sensing circuit according to claim 1, wherein the switching subcircuit comprises a relay configured to switch the fault resistor in parallel with the EOLR.

7. The fault sensing circuit according to claim 1, wherein the remote device is one a plurality of remote devices that each have the fault sensing circuit for self-fault detection in a fire alarm system.

8. A fire detection system using an end of line resistor (EOLR) to detect wiring faults, comprising:

- a fire alarm control panel; and
- a plurality of remote devices operating in parallel, each comprising a fault sensing circuit that includes:
  - a current monitoring subcircuit configured to detect when an input current of a remote device in which the fault sensing circuit is installed has crossed a fault threshold corresponding to a fault in the remote device; and
  - a switching subcircuit connected to the current monitoring subcircuit and the EOLR, the switching subcircuit configured to electrically connect a fault resistor in parallel with the EOLR to change a value of an end of line resistance for a fault indication when the input current of the remote devices has crossed the fault threshold.

9. The fire detection system according to claim 8, wherein the fault sensing circuit in each of the plurality of remote devices further comprises another switching subcircuit connected to the current monitoring subcircuit and configured to light up a light emitting diode (LED) of the remote device when the input current of the remote device has crossed the fault threshold.

10. The fire detection system according to claim 8, wherein the fire alarm control panel comprises a light emitting diode (LED) configured to light up in response to the change in the value of the end of line resistance by the fault resistor.

11. The fire detection system according to claim 8, wherein the fire alarm control panel comprises a sound emitting device configured to generate a sound in response to the change in the value of the end of line resistance by the fault resistor.

12. The fire detection system according to claim 8, wherein the change in the value of the end of line resistance by the fault resistor is configured to cause an action to be performed at the fire alarm control panel indicative of a remote fault in one of the plurality of remote devices.

13. The fire detection system according to claim 8, wherein the switching subcircuit comprises a Metal Oxide Semiconductor Field Effect Transistor (MOSFET) configured to switch the fault resistor in parallel with the EOLR.

14. The fire detection system according to claim 8, wherein the switching subcircuit comprises a relay configured to switch the fault resistor in parallel with the EOLR.

15. A method for fault sensing by a fault sensing circuit in a remote device, the remote device configured to be connected to an end of line resistor (EOLR) that is used to detect wiring faults, the method comprising:

detecting, by a current monitoring subcircuit, when an input current of the remote device has crossed a fault threshold corresponding to a fault in the remote device; and electrically connecting, by a switching subcircuit connected to the current monitoring subcircuit and the EOLR, a fault resistor in parallel with the EOLR to change a value of an end of line resistance for a fault indication when the input current of the remote device has crossed the fault threshold.

16. The method according to claim 15, wherein the fault sensing circuit further includes a light emitting diode (LED), and wherein the method further comprising outputting, by the current monitoring subcircuit, a current indicative of a fault state of the remote device to the LED, the LED lighting up when the input current of the remote device has crossed the fault threshold.

17. The method according to claim 15, wherein the remote device is one a plurality of remote devices that each have a respective fault sensing circuit for self-fault detection in a fire alarm system.

18. The method according to claim 15, further comprising lighting another LED at a remote control panel responsive to the change in the value of the end of line resistance by the fault resistor.

19. The method according to claim 15, further comprising causing an action to be performed at a remote control panel indicative of a remote fault in a non-specific one of the remote device and a plurality of other remote devices, responsive to the change in the value of the end of line resistance by the fault resistor.

20. The method according to claim 15, further comprising causing a remote overcurrent indication reading at a connected control panel responsive to the change in the value of the end of line resistance by the fault resistor.

* * * * *